United States Patent
D'Angelo et al.

(10) Patent No.: US 7,330,544 B2
(45) Date of Patent: Feb. 12, 2008

(54) DIGITAL ISOLATION BARRIER AS INTERFACE BUS FOR MODEMS

(75) Inventors: Wilfrid C. D'Angelo, La Trinité (FR); Jean F. Latu, Juan-les-Pins (FR)

(73) Assignee: Conexant Systems, Inc., Newport Beach, CA (US)

( * ) Notice: Subject to any disclaimer, the term of this patent is extended or adjusted under 35 U.S.C. 154(b) by 844 days.

(21) Appl. No.: 10/137,601

(22) Filed: Apr. 29, 2002

(65) Prior Publication Data
US 2003/0179818 A1    Sep. 25, 2003

(30) Foreign Application Priority Data
Mar. 20, 2002 (EP) .................................. 02290712

(51) Int. Cl.
H04M 1/00      (2006.01)
H04M 9/00      (2006.01)
(52) U.S. Cl. .................. 379/399.01; 375/222
(58) Field of Classification Search ................. 379/399.01–413.04; 375/222
See application file for complete search history.

(56) References Cited

U.S. PATENT DOCUMENTS

| | | | |
|---|---|---|---|
| 5,384,808 A | | 1/1995 | Brunt et al. |
| 5,654,984 A | * | 8/1997 | Hershbarger et al. ........ 375/257 |
| 5,737,397 A | * | 4/1998 | Skinner et al. ........... 379/93.29 |
| 6,067,583 A | * | 5/2000 | Gilbert ........................ 710/8 |
| 6,122,216 A | | 9/2000 | Dykes |
| 6,169,475 B1 | | 1/2001 | Browning |
| 6,169,801 B1 | | 1/2001 | Levasseur et al. |
| 6,173,405 B1 | * | 1/2001 | Nagel ............................ 726/21 |
| 6,182,893 B1 | | 2/2001 | Greene et al. |
| 6,212,263 B1 | | 4/2001 | Sun et al. |
| 6,285,706 B1 | * | 9/2001 | Skinker et al. .............. 375/222 |
| 6,351,530 B1 | * | 2/2002 | Rahamim et al. ....... 379/399.01 |
| 6,401,152 B1 | | 6/2002 | Solomon et al. |

(Continued)

FOREIGN PATENT DOCUMENTS

JP    11-175211    7/1999

(Continued)

OTHER PUBLICATIONS

Funasaki, Silicon DAAs Take the Stage, Semiconductors: Data and Voice Communications, International Data Corporation #XXXXXX, vol. 2, pp. 1-6.

Primary Examiner—Ramnandan Singh
(74) Attorney, Agent, or Firm—Farjami & Farjami LLP

(57) ABSTRACT

The present application provides a variety of exemplary embodiments, such as modem systems, modem devices, modem connectors, host connectors, communication systems and communication cards. For example, there is provided a modem device for use to enable a host to communicate over a communication line, wherein the host has a host connector. The modem device comprises a line side circuitry capable of interfacing with the communication line; and a digital isolation barrier (DIB) coupled to the line side circuitry, the digital isolation barrier capable of being connected to a modem connector for connection to the host connector, wherein the digital isolation barrier is capable of isolating the modem connector from the line side circuitry. Moreover, the line side circuitry may include a line side DIB interface for communication with the digital isolation barrier. Also, the modem connector may be connected to the digital isolation barrier via one or more lines.

12 Claims, 11 Drawing Sheets

U.S. PATENT DOCUMENTS

| | | |
|---|---|---|
| 6,427,011 B1 * | 7/2002 | Sacca .................... 379/399.01 |
| 6,697,464 B1 * | 2/2004 | Nelson et al. ........... 379/93.05 |
| 6,876,742 B1 * | 4/2005 | Sacca ........................ 379/412 |

FOREIGN PATENT DOCUMENTS

| | | |
|---|---|---|
| JP | 11-317445 | 11/1999 |
| JP | 2001-036636 | 2/2001 |
| JP | 2001-339467 | 12/2001 |
| WO | WO 95/04318 A1 | 2/1995 |
| WO | WO 9504318 A | 2/1995 |
| WO | WO 9948272 A | 9/1999 |
| WO | WO 0030333 A | 5/2000 |
| WO | WO 00/67458 A1 | 11/2000 |

\* cited by examiner

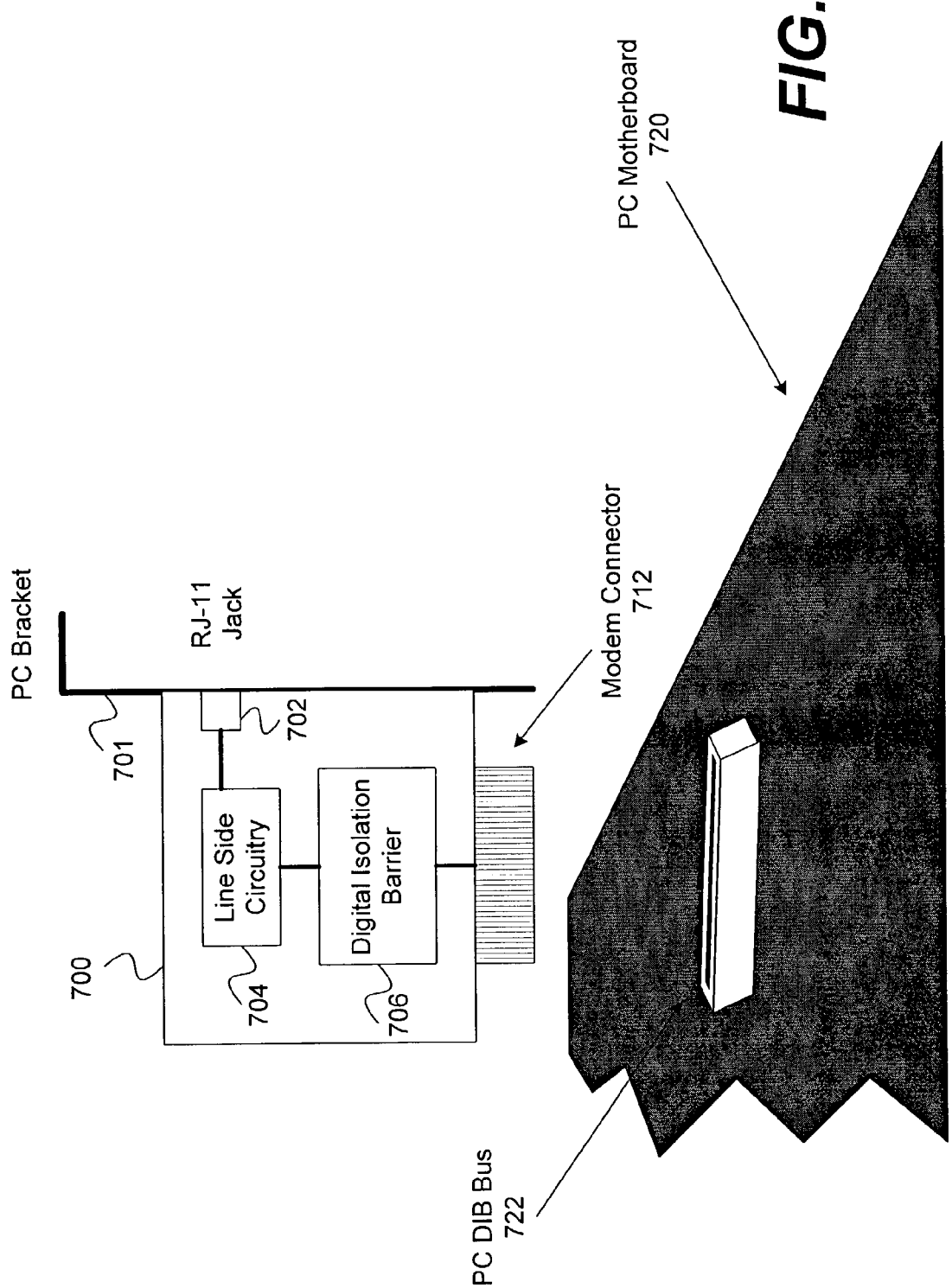

Modem 800
Modem Componnets 810
Phone Line Receiver 805
Phone Line Jack 803

Modem 820

DIGITAL ISOLATION BARRIER AS INTERFACE BUS FOR MODEMS

INCORPORATION BY REFERENCE

"This application claims priority under 35 USC § 119 from European Application No. EP 02290712.5 filed in the European Patent Office on Mar. 20, 2002."

The commonly-assigned U.S. Pat. No. 6,351,530, issued Feb. 26, 2002, is hereby incorporated by reference in its entirety, including drawings and appendices, into the present application and is hereby made part of the present application for all purposes.

BACKGROUND OF THE INVENTION

1. Field of the Invention

The present invention relates generally to modems and, more particularly, to the use of a digital isolation barrier as a digital communication bus between a modem and a host.

2. Related Art

As in other computer-related areas of technology, the modem technology has been on a rapid pace of change and progress, and has evolved tremendously since about just two decades ago. Modem (or Modulator/Demodulator) is a device that adapts a host, such as a terminal or computer to a communication medium, such as an analog telephone line, by converting digital pulses to audio frequencies and vice versa. The term modem also refers to and encompasses cable or DSL modem or ISDN terminal adapter for purposes of the present invention. Also, for purposes of the present invention, a host includes any information handling system, such as a computer, set-top box, game console or any other device or system that utilizes the modem to communicate via the communication medium.

FIG. 1A provides a glance at the modem evolution throughout the recent years. As shown, in one conventional embodiment, modem 100 communicates data with host 101, such as a terminal or a computer, in digital format, via modem side bus interface 104. As shown, host 101 includes host bus/connector 103, which provides a connection between host 101 and modem 100 via host side bus interface 102 and modem side bus interface 104. Modem 100 is further capable of communicating with a remote device, in analog format, via telephone network 108. Telephone network 108 may be part of a public switched telephone network ("PSTN"). It should be noted that, throughout the present application the terms "bus" and "connector", may be used interchangeably, and either term refers to any type of conductor or channel that is capable of providing a communication path.

Modem 100 depicts an early modem design, which is known as a controller-based modem. As shown, modem 100 includes controller 105, digital signal processor ("DSP") 106 and data access arrangement ("DAA") 107. In such design, controller 105 controls all the modem functions and modem components, including DSP 106 and DAA 107. Controller 105 also controls modem side bus interface 104. Controller can be any type of microprocessor, such as a Rockwell 6502-based processor. Controller 105 executes instructions residing in a memory device (not shown), such as an EPROM, which stores the modem software. According to the instructions stored in the memory, controller 105 is able to control DSP 106, DAA 107 and modem side bus interface 104. DSP 106 performs the task of modulating signals received via modem side bus interface 104 and transmitting the modulated signals to DAA 107 for digital to analog conversion and transmission over the telephone line. Further, DSP 106 demodulates signals received from DAA 107 after analog to digital conversion by DAA 107 and provides the demodulated signals for transmission over modem side bus interface 104 to host 101.

DAA 107 generally refers to circuitry, which provides an interface with a telephone line originating from the telephone central office. DAA 107 electrically isolates the rest of modem 100 from the telephone line. For example, DAA 107 provides galvanic isolation to prevent voltage surges or transients originating from modem 100 from having a deleterious effect on telephone network 108. Electrical isolation also addresses potential problems associated with differences in operating voltages between the telephone line and modem 100. More particularly, telephone line voltages may vary widely across a given network, and often exceed the operating voltage of modem 100. In addition to electrical isolation, DAA 107 often provides a variety of signals, such as a ring signal for use by modem 100.

As a next generation of modems, controllerless modem 110 was introduced, which includes modem side bus interface 114, DSP 116 and DAA 117, but not a controller, for use to enable host 111 to communicate over telephone network 118. In such designs, a host controller (not shown) residing in host 111 controls controllerless modem 110 via host side bus interface 112, which may be connected to modem side bus interface 114 via host bus 113. DSP 116 and DAA 117 perform similar functions as DSP 106 and DAA 107, respectively.

Turning to a more recent generation of modems, soft modem 120 includes DAA 127, but neither a controller nor a DSP, for use to enable host 121 to communicate over telephone network 128. According to the soft modem design, a host controller (not shown) residing in host 121 provides DSP functionality and further controls soft modem 120 via host side bus interface 122, which may be connected to modem side bus interface 124 via host bus 123. DAA 127 performs similar functions as DAA 107 and DAA 117.

Such existing modem configurations, however, introduce many drawbacks, inefficiencies and excessive costs when such modems are submitted for homologation or approval by regulatory agencies throughout the world, which have established standards and regulations in each country, for connecting subscriber equipment, such as a modem to a telephone network. The homologation procedures are intended to confirm compliance with telephone standards and regulations in each country in order to prevent damage to the telephone network and mitigate interference with other equipment also connected to the telephone network. The homologation procedures, however, often present difficult design challenges, can be lengthy and result in excessive costs to be incurred by applicants. For example, worldwide homologation typically takes between 6-12 months and can cost in the range of $100,000 to $200,000. Accordingly, modem homologation is a main source of costs, delays and engineering burden that must be endured by modem manufacturers for each new modem design.

Turning to FIG. 1B, it illustrates an evolutionary block diagram of various conventional host or computer connectors/buses for modem communications. Originally, desktop computers provided a serial interface, such as an RS-232 serial bus (Recommended Standard by TIA/EIA) 130, which later evolved into universal serial bus ("USB"). RS-232 serial bus 130 uses a 25-pin DB-25 or 9-pin DB-9 connector. Next, the Industry Standard Architecture ("ISA") bus 131 was introduced in various form factors to function as an expansion bus commonly used in personal computers. ISA bus 131 can accept plug-in boards that control peripheral devices, such as modems. As a later generation of personal computer buses, Peripheral Component Interconnect ("PCI") bus 132 was introduced, as a peripheral bus commonly used in personal computers. PCI bus 132 provides a high-speed data path between the host processor and peripheral devices, such as modem devices. There are typically three or four PCI slots on a given motherboard.

A more recent personal computer bus is Audio/Modem Riser ("AMR") bus 133 that supports a plug-in card into the motherboard that contains audio and/or modem circuits. AMR bus is a 46-pin bus that provides the digital interface between the card and the motherboard. AMR bus has evolved into a Communications and Networking Riser ("CNR") bus with a 30-pin interface and an Advanced Communications Riser ("ACR") bus with a 106-pin interface. CNR and ACR provide additional support, such as LAN, DSL or Ethernet interface.

Similar personal computer buses have been introduced for laptop computers, such as ISA bus 140 with proprietary interfaces, Personal Computer Memory Card International Association ("PCMCIA") bus 141, Mini PCI bus 142, similar to PCI bus 122, and Mobile Daughter Card bus ("MDD") 143, similar to AMR bus 133.

Existing personal computer buses for modem communications, however, suffer from many problems, such as too many connector pins, occupying too much space, and not being uniform in pin-outs and specifications. As a result, various modem side bus interfaces (such as modem side bus interfaces 103, 113 and 123) must be provided for each modem design for compliance with numerous bus standards. Therefore, excessive costs must be incurred and many hours of engineering efforts must be spent to design and manufacture modems with various modem side bus interfaces.

Furthermore, in the more recent years, as soft modems continue to displace traditional hardware modems, such as modem 100 and modem 110, silicon DAAs have, as a result, been experiencing rapid growth. As discussed above, DAAs are used as telephone line interfaces and are required in any device that connects to the telephone line or any other similar communication line. Traditionally, DAAs have been implemented in analog modems, such as modem 100, as an assortment of transformers, relays, opto-isolators and discrete components. But, in order to reduce the high cost, power consumption and space associated with the traditional DAAs, DAAs started to be designed for silicon implementation, thus giving rise to silicon DAAs. Early on, silicon DAAs relied on the transfer of analog signals across an isolation barrier and still required many discrete components. Lately, however, silicon DAA solutions utilize an integrated codec and transmit digital signals across capacitors to reduce cost, power consumption and space. For example, FIG. 1 of the commonly-assigned U.S. Pat. No. 6,351,530, issued Feb. 26, 2002, which is incorporated by reference in the present patent application, illustrates an exemplary silicon DAA design. The DAA includes a digital isolation barrier coupled to a system side circuitry at one end and to a line side circuitry at the other. Line side circuitry includes a digital isolation barrier interface and a codec, and is connected to a telephone line. Also, the system side circuitry includes a digital isolation barrier interface and a host interface, and is connected to a host via a connector.

Today's silicon DAA solutions, however, still fail to insulate host side components and the DAA. Therefore, clearance and creepage of DAA components and other components must still be addressed during the design process, which require expert knowledge and cause additional costs and time to market delays. In addition, each new design including the DAA and the host side components, in combination, must be formally tested in accordance with the safety requirements and regulatory homologation regulations. Accordingly, a given silicon DAA must undergo the homologation process, in combination with the system in which the silicon DAA has been designed into, over and over again, which, as stated above, causes a delay of about 6-9 months and costs of about $100,000-$200,000, for worldwide homologation.

SUMMARY OF THE INVENTION

In accordance with the purpose of the present invention as broadly described herein, there is provided a variety of exemplary embodiments, such as modem systems, modem devices, modem connectors, host connectors, communication systems and communication cards.

For example, in one aspect of the present invention, there is provided a modem system for use to enable a host to communicate over a communication line, wherein the host has a host connector. The modem system comprises: a line side circuitry capable of interfacing with the communication line; a digital isolation barrier (DIB) coupled to the line side circuitry; and a modem connector connected to the digital isolation barrier and capable of connecting the digital isolation barrier to the host connector, wherein the digital isolation barrier isolates the modem connector from the line side circuitry.

In another aspect, there is provided a modem device for use to enable a host to communicate over a communication line, wherein the host has a host connector. The modem device comprises: a line side circuitry capable of interfacing with the communication line; and a digital isolation barrier (DIB) coupled to the line side circuitry, the digital isolation barrier capable of being connected to a modem connector for connection to the host connector, wherein the digital isolation barrier is capable of isolating the modem connector from the line side circuitry.

In yet another aspect, there is provided a modem system for use to enable a host to communicate over a communication line, wherein the host has a host connector. The modem system comprises: a communication line receiver having an opening for receiving the communication line, the opening defining a plurality of side walls; a line side circuitry capable of interfacing with the communication line receiver; and a digital isolation barrier (DIB) coupled to the line side circuitry, the digital isolation barrier capable of being connected to a modem connector, wherein the digital isolation barrier isolates the modem connector from the line side circuitry; wherein the modem connector is capable of being connected to the host connector, and wherein the line circuitry and the digital isolation barrier populate one or more of the plurality of side walls.

In one aspect, there is provided a communication system capable of communicating over a communication line. The communication system comprises: a modem including a line side circuitry capable of being connected to the communication line, a digital isolation barrier (DIB) coupled to the line side circuitry and a modem connector coupled to the digital isolation barrier; and a host including a modem connector receiving the modem connector, a host side DIB interface coupled to the modem connector, and a host processor coupled to the host side DIB interface; wherein the host processor controls the modem.

In another aspect, there is provided a communication system capable of communicating over a communication line. The communication system comprises: a modem including a line side circuitry capable of being connected to the communication line, a digital isolation barrier (DIB) coupled to the line side circuitry and a modem connector coupled to the digital isolation barrier; and a host including a communication card, the communication card having a modem connector, for receiving the modem connector, and a host side DIB interface coupled to the modem connector.

In an additional aspect of the present invention, there is provided a communication card capable of connecting a host to a modem. The communication card comprises: a card-modem connector; a card-host connector capable of being connected to the host; wherein the modem includes a line side circuitry capable of being connected to a communication line, a digital isolation barrier (DIB) coupled to the line side circuitry and a modem connector coupled to the digital isolation barrier, and wherein the card-modem connector is capable of being connected to the modem connector.

In one more aspect, there is provided a modem connector for connecting a modem to a host. The modem connector comprises: a data line for communicating data between the modem and the host; wherein the modem includes a line side circuitry capable of interfacing with the communication line, a digital isolation barrier (DIB) coupled to the line side circuitry, the digital isolation barrier capable of being connected to the modem connector for connection to the host connector, wherein the digital isolation barrier is capable of isolating the modem connector from the line side circuitry.

In yet another aspect, there is provided a host connector for connecting a modem to a host. The host connector comprises: a data line for communicating data between the modem and the host; wherein the modem includes a line side circuitry capable of interfacing with the communication line, a digital isolation barrier (DIB) coupled to the line side circuitry, the digital isolation barrier capable of being connected to the host connector for connection to the host, wherein the digital isolation barrier is capable of isolating the host connector from the line side circuitry.

In various aspects of the present invention, the line side circuitry may include a line side DIB interface for communication with the digital isolation barrier. Moreover, in some aspects, the modem connector may be connected to the digital isolation barrier via a single line of data/control. In addition, the modem connector may be connected to the digital isolation barrier via the single line of data/control and one ground line.

Also, the digital isolation barrier may be coupled to the line side circuitry via a plurality of lines including two lines of data/control and two lines of power/clock, and the plurality of lines may include a ground line. Yet, the modem connector may be connected to the digital isolation barrier via a plurality of lines including two lines of data/control and two lines of power/clock, and the plurality of lines may include a ground line. Even more, the modem connector may be connected to the digital isolation barrier via a single differential pair of lines of data/control. Also, the modem connector may be connected to the digital isolation barrier via the single differential pair of lines of data/control and one ground line. Yet, in some aspects, the modem connector may be connected to the digital isolation barrier via a plurality of differential pair of lines of data/control. Also, in some aspects, the modem connector may be connected to the digital isolation barrier via the plurality of differential pair of lines of data/control and one ground line.

In one exemplary aspect of the present invention, there is provided a modem connector for connecting a modem to a host, wherein the modem includes a digital isolation barrier (DIB) coupled to a line side circuitry for communication with a communication line. The modem connector comprises: a data line for communicating data between the modem and the host; a clock line for clocking the data between the modem and the host; and a power line for providing power from the host to the modem; wherein the data line, the clock line and the power line are capable of being connected to the digital isolation barrier, which is capable of isolating the modem connector from the line side circuitry. In addition, the data line may include a transmit path and a receive path, or the data line may be a bi-directional path. Also, the host may includes a host side DIB interface, wherein the modem connector provides the lines to host DIB interface. For example, the modem connector may further comprise a four-wire cable including the lines or may further comprise a ground line.

In another exemplary aspect, there is provided a host connector for communication with a modem, the modem including a digital isolation barrier (DIB) coupled to a line side circuitry for communication with a communication line. The host connector comprises: a data line for communicating data between the modem and the host; a clock line for clocking the data between the modem and the host; and a power line for providing power from the host to the modem; wherein the data line, the clock line and the power line are capable of being connected to the digital isolation barrier, which is capable of isolating the host connector from the line side circuitry. Moreover, the data line may include a transmit path and a receive path, or the data line is a bi-directional path. In one aspect, the host may include a host side DIB interface, wherein the host connector provides the lines to host DIB interface. In addition, the modem connector may further comprise a ground line.

These and other aspects of the present invention will become apparent with further reference to the drawings and specification, which follow. It is intended that all such additional systems, methods, features and advantages be included within this description, be within the scope of the present invention, and be protected by the accompanying claims.

BRIEF DESCRIPTION OF DRAWINGS

The features and advantages of the present invention will become more readily apparent to those ordinarily skilled in the art after reviewing the following detailed description and accompanying drawings, wherein:

FIG. 7 illustrates a block diagram of an exemplary modem of the present invention for connection to a computer motherboard;

DESCRIPTION OF EXEMPLARY EMBODIMENTS

The present invention may be described herein in terms of functional block components and various processing steps. It should be appreciated that such functional blocks may be realized by any number of hardware components and/or software components configured to perform the specified functions. For example, the present invention may employ various integrated circuit components, e.g., memory elements, digital signal processing elements, transmitters, receivers, tone detectors, tone generators, logic elements, and the like, which may carry out a variety of functions under the control of one or more microprocessors or other control devices. Further, it should be noted that the present invention may employ any number of conventional techniques for data transmission, signaling, signal processing and conditioning, tone generation and detection and the like. Such general techniques that may be known to those skilled in the art are not described in detail herein.

It should be appreciated that the particular implementations shown and described herein are merely exemplary and are not intended to limit the scope of the present invention in any way. For example, although the present invention is described using an analog modem, the present invention may be implemented in other communication devices interfacing with any communication medium. Indeed, for the sake of brevity, conventional analog circuit, circuit components, data transmission, tone generation and detection, encoding, decoding, signaling and signal processing and other functional aspects of the data communication system (and components of the individual operating components of the system) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical communication system.

Figure 2:
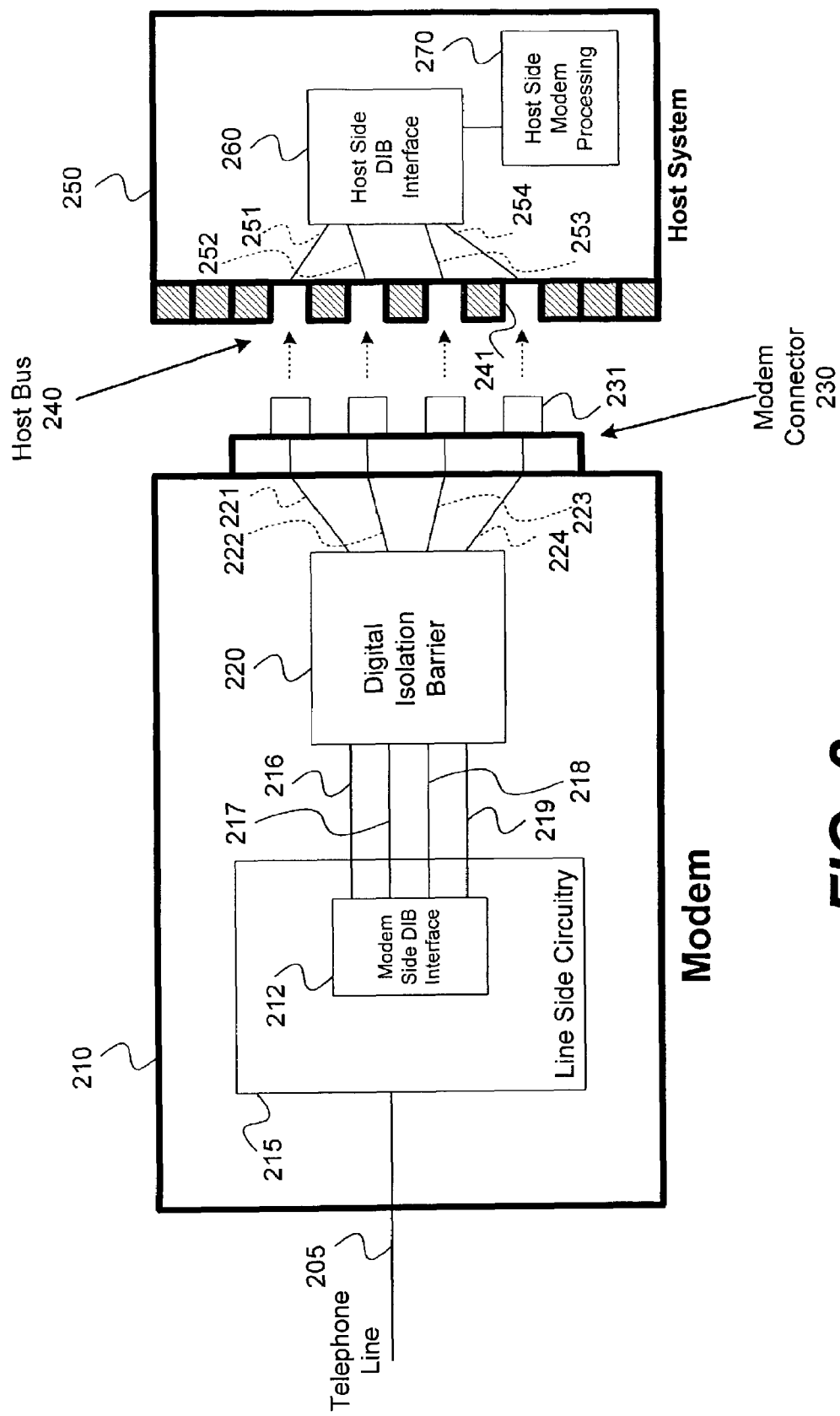
FIG. 2 illustrates a block diagram of a communication system, including a host and a modem with a line side circuitry, digital isolation barrier and a modem connector, according to one embodiment of the present invention.

FIG. 2 illustrates a block diagram of an exemplary communication system, including host 250, and modem 210 for use to enable host 250 to communicate over telephone line 205. As stated above, use of a computer as a host or a telephone line as a communication medium to describe different embodiments of the present application is merely exemplary. In fact, various embodiments of the present invention can be implemented for use by any host, such as a computer, set-top box, game console, or any other device or system that may utilize a modem of the present invention to communicate via any communication medium, such as telephone line 205, a cable line, a power line, or any other communication channel suitable for modem communication. Other possible hosts can be alarm systems, remote control systems, monitoring systems, cameras, residential and professional gateways, television sets, radios, display panels, facsimile machines, answering machines, wired telephones, cordless telephones, cellular telephones, BlueTooth and wireless modem plugs, Internet appliances, etc.

Figure 1A:
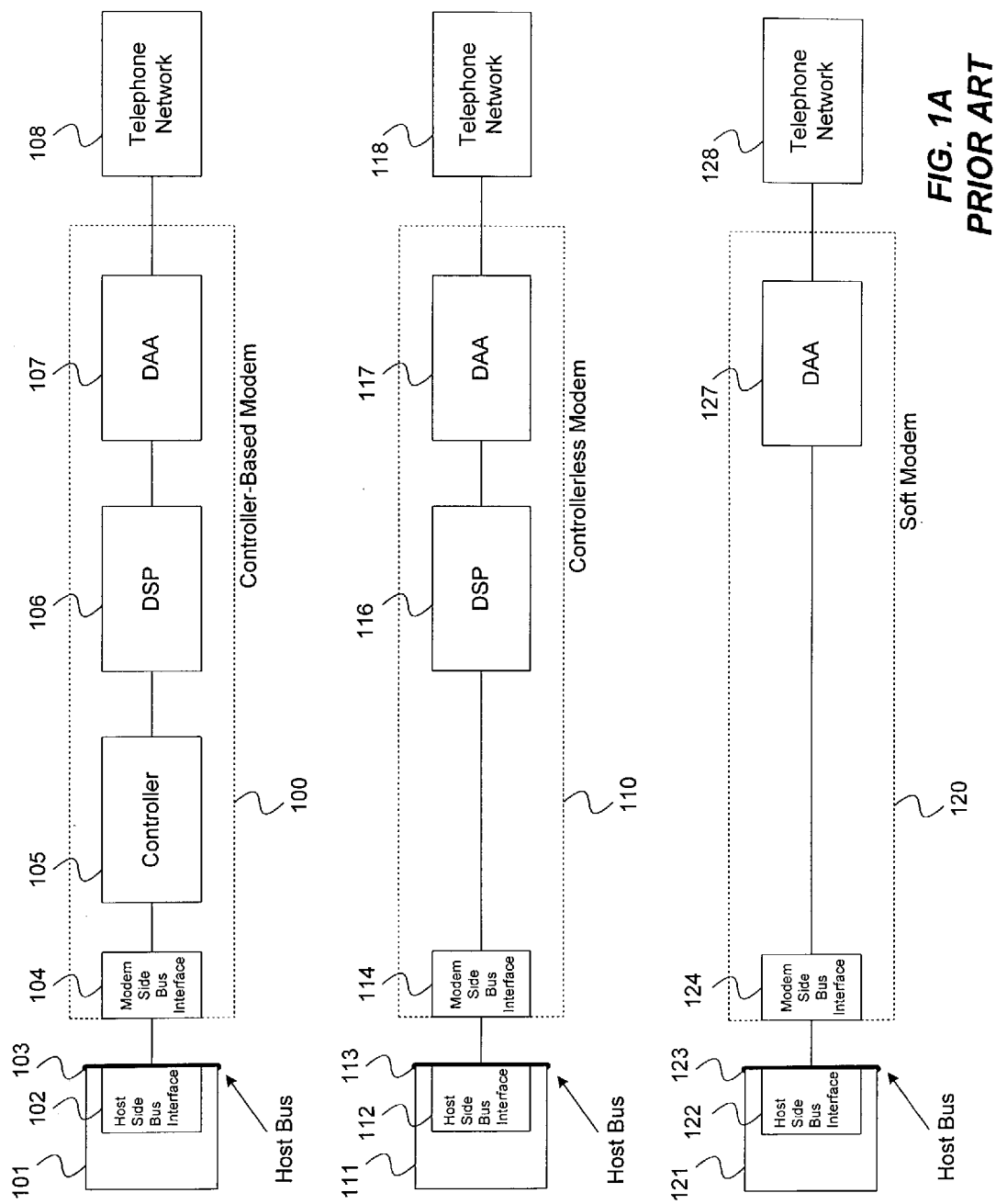
FIG. 1A illustrates an evolutionary block diagram of various conventional modems.
Figure 1B:
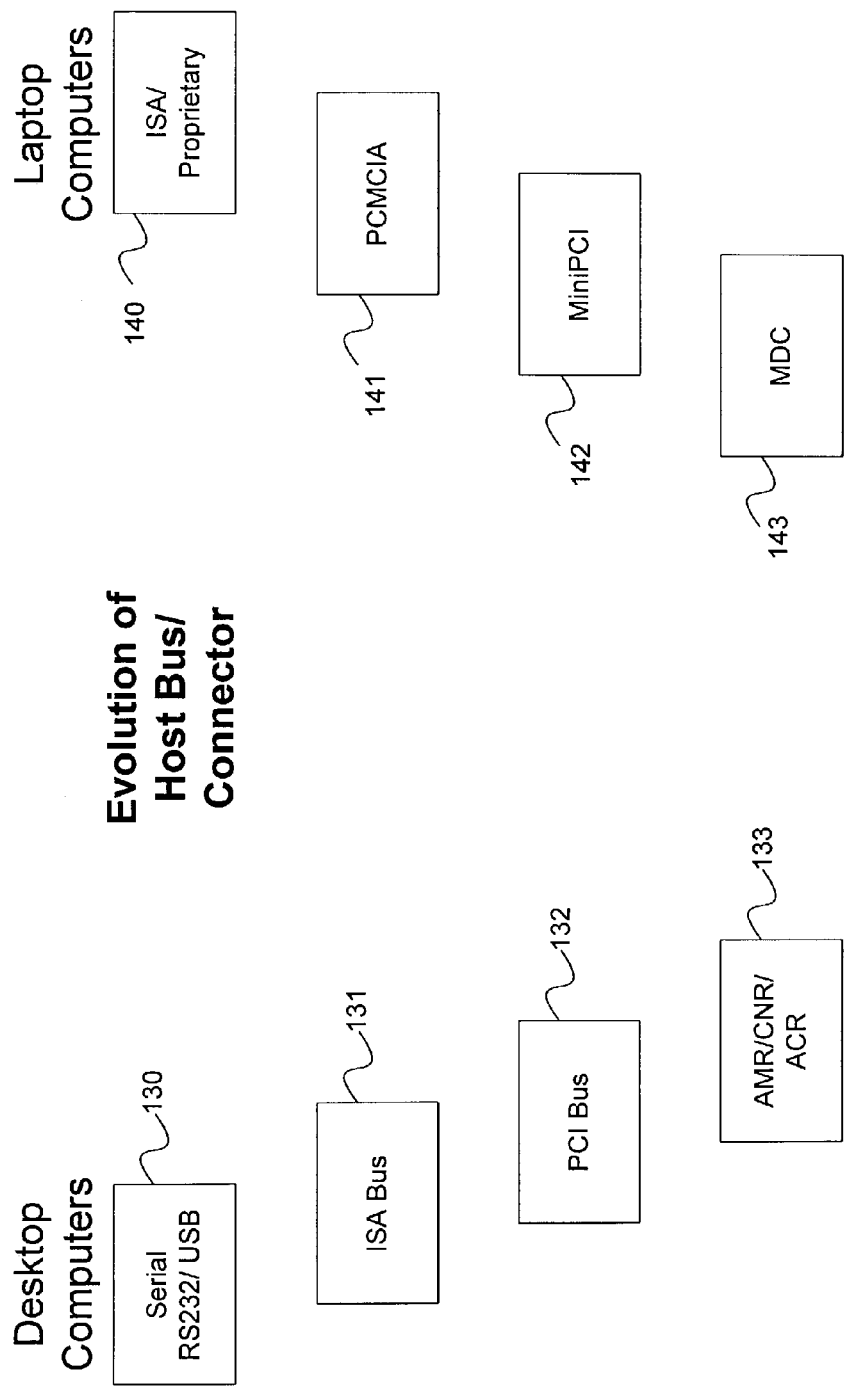
FIG. 1B illustrates an evolutionary block diagram of various conventional host connectors/buses for modem communications.
Figure 3A:
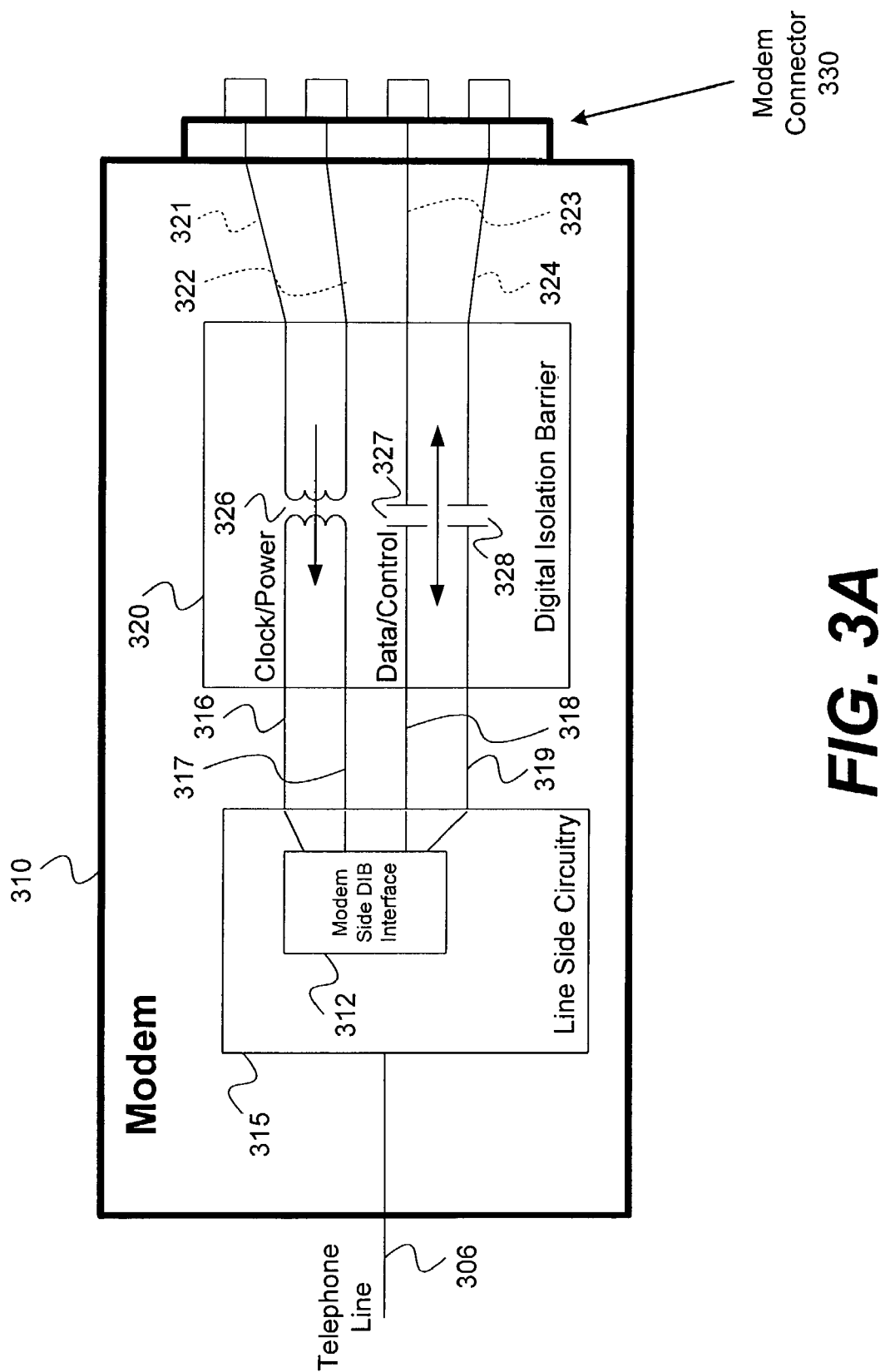
FIG. 3A illustrates a block diagram of the digital isolation barrier of the communication system of FIG. 2.

As shown, modem 210 includes digital isolation barrier ("DIB") 220, which is coupled in between line side circuitry 215 and modem connector 230. Digital isolation barrier 220, which will be discussed in more detail in conjunction with FIG. 3A, provides electrical isolation between line side circuitry 215 and modem connector 230. Line side circuitry 215 operates with a floating ground reference, and can tolerate high voltage inputs for operation with telephone 205 and typical surge requirements. Modem connector 230, however, operates with a fixed digital ground and utilizes standard CMOS logic levels. As shown, in the present embodiment, modem connector 230 is connected to digital isolation barrier 220 via four wires 221-224. As it should be appreciated, unlike the embodiment described in FIG. 1 of U.S. Pat. No. 6,351,530, for example, modem 210 of the present embodiment does not include a digital isolation barrier interface between digital isolation barrier 220 and modem connector 230. In other words, digital isolation barrier 220 is connected to modem connector 230 without a digital isolation barrier interface as an intermediary.

It should be noted that the number of wires between (1) line side circuitry 215 and digital isolation barrier 220, (2) digital isolation barrier 220 and modem connector 230, or (3) modem connector 230 and host 250, may vary from embodiment to embodiment, and various embodiments of the present invention may be implemented using any number of wires, e.g. 1 through n. Accordingly, use of four wires is merely exemplary.

In the embodiment shown, modem connector 230 includes connector pins 231, which can be received by slots 241 of host bus/connector 240. Modem connector 230 and host bus 240 provide a one-to-one connectivity between lines 221-224 of modem 210 and lines 251-254 of host 250. Four wires 221-224 of digital isolation barrier 220 include clock and power signal lines 221 and 222, as well as data and control signal lines 218 and 219, which coordinate bi-directional transfer of data, control and programming signals across digital isolation barrier 220. Through host bus 240 and modem connector 230, modem 210 shares a common ground and power supply with host 250.

Line side circuitry 215, which will be discussed in more detail in conjunction with FIG. 4, includes modem side DIB interface 212 for interfacing line side circuitry 215 with digital isolation barrier 220. As shown, four lines 216-219 provide connectivity between digital isolation barrier 220 and line side circuitry 215. Four lines 216-219 have a one-to-one correspondence with lines 221-224, which were discussed above.

Turning to host 250, which will be discussed in more detail in conjunction with FIG. 5, it includes host side DIB interface 260 for interfacing host 250 with digital isolation barrier 220 through host bus 240 and modem connector 230. As shown, host side DIB interface 260 is connected to host bus or connector 240 via four lines 251-254, which correspond to four lines 221-224 of digital isolation barrier 220. Host 250 further includes host side modem processing 270, which may be any one of modem configurations described in FIG. 1. For example, in one embodiment, host side modem processing 270 may include a controller and a DSP, and perform as controller-based modem 100. Yet, in another embodiment, host side modem processing 270 may include a DSP, and be controlled by a host controller (not shown) in order to perform as a controllerless modem 120. In some embodiments, host side modem processing 270 may not exist, in which configuration, a host controller (not shown) controls host side DIB interface 260 and other modem and DSP operations, in order to function as soft modem 120. As stated above, it should be noted that modem connector 230 or host bus/connector 240 can be any type of conductor or channel that is capable of providing a communication path.

As one of the advantages of modem 210, for example, worldwide homologation costs and delays will be substantially reduced, due to the fact, once approved, modem 210 can be utilized in accordance to any existing configuration (such as controller-based modem, controllerless modem or soft modem) or in any host, without requiring such configuration or host to be re-homologated. Furthermore, modem 210 has substantially less number of components compared to existing modems. Because modem 210 can provide a macro-component for adapting the communication line to the host, the need for expert knowledge by modem manufacturers with respect to safety requirements, such as electromagnetic compatibility/electromagnetic interference ("EMC/EMI"), will be lessened. As a result of a faster homologation process, reduction in the number of configurations and hosts to be homologated, reduction in engineering burden and expert knowledge, modem 210 manufacturers may save significant cost and substantially shorten their time to market.

FIG. 3A illustrates exemplary modem 310, including line side circuitry 315 and digital isolation barrier 320, according to one embodiment of the present invention. As shown, digital isolation barrier 320 is connected to modem connector 330 via four lines 321-324 at one side, and at the other side, digital isolation barrier 320 is connected to line side circuitry 315 via four lines 316-319. In the embodiment shown, digital isolation barrier 320 includes a transformer 326 for communicating clock and power signals from modem connector 330 to modem side DIB interface 312 of line side circuitry 315 via lines 321-322 and 316-317. More specifically, the primary side of transformer 326, i.e. lines 321-322, is driven by modem connector 330 (when connected to a host), such that clock and power signals of sufficient strength can be derived from the secondary side of the transformer 326, i.e. lines 316-317. The clock signal, if provided, is coupled to line side circuitry 315 via a relatively small value capacitor (not shown). The power connections of line side circuitry 315 may be coupled to the secondary side of transformer 326 via a half wave rectifier comprising a voltage regulating diode (not shown) and a charge storage capacitor (not shown). The capacitor is provided across the power and ground connections of line side circuitry 315 to provide a stable power supply voltage. Although the above-described embodiment employs a half wave rectifier, a full wave rectifier or a bridge rectifier could also be utilized.

Digital isolation barrier 320 also includes a differential configuration involving two capacitors 327 and 328. In this embodiment, a serial datastream including data, control and/or programming signals are communicated across a data path provided by two capacitors 327 and 328. In some embodiments, a differential bi-directional line providing a bi-directional transmit/receive path, may be implemented using a separate receive data path and a transmit data path. In one embodiment, two capacitors 327 and 328 may be replaced by a single capacitor, in which event the serial datastream are communicated across a signal path employing the single capacitor (not shown). In yet another embodiment, digital isolation barrier 320 may include an isolation transformer (not shown) to replace capacitors 327 and 328.

As a result, data, control and/or programming signals may be communicated between line side circuitry 315 and modem connector 330. One of ordinary skill in the art would know that other types of circuitry (such as opto-couplers and thermal relay circuitry) may be used to effect digital isolation barrier 320, in accordance with the present invention. Furthermore, digital isolation barrier 320 may include transformers, capacitors or any other components that can satisfy the requirements of an isolation between Telephone Network Voltage ("TNV") and Safety Extra Low Voltage ("SELV") circuits as defined in Safety Standard IEC60950, which are hereby incorporated by reference, or other similar standards.

It should be noted that in some embodiments, four lines 321-324 and 316-319 may be reduced to single lines 324 and 319, respectively, wherein, as described above, a single capacitor provides the serial datastream across a signal path including lines 324 and 319. Yet, in another embodiment, four lines 321-324 and 316-319 may be reduced to double lines 323-324 and 318-319, respectively, wherein, as described above, two capacitors provide the serial datastream across a path including lines 323-324 and 318-319.

Figure 3B:
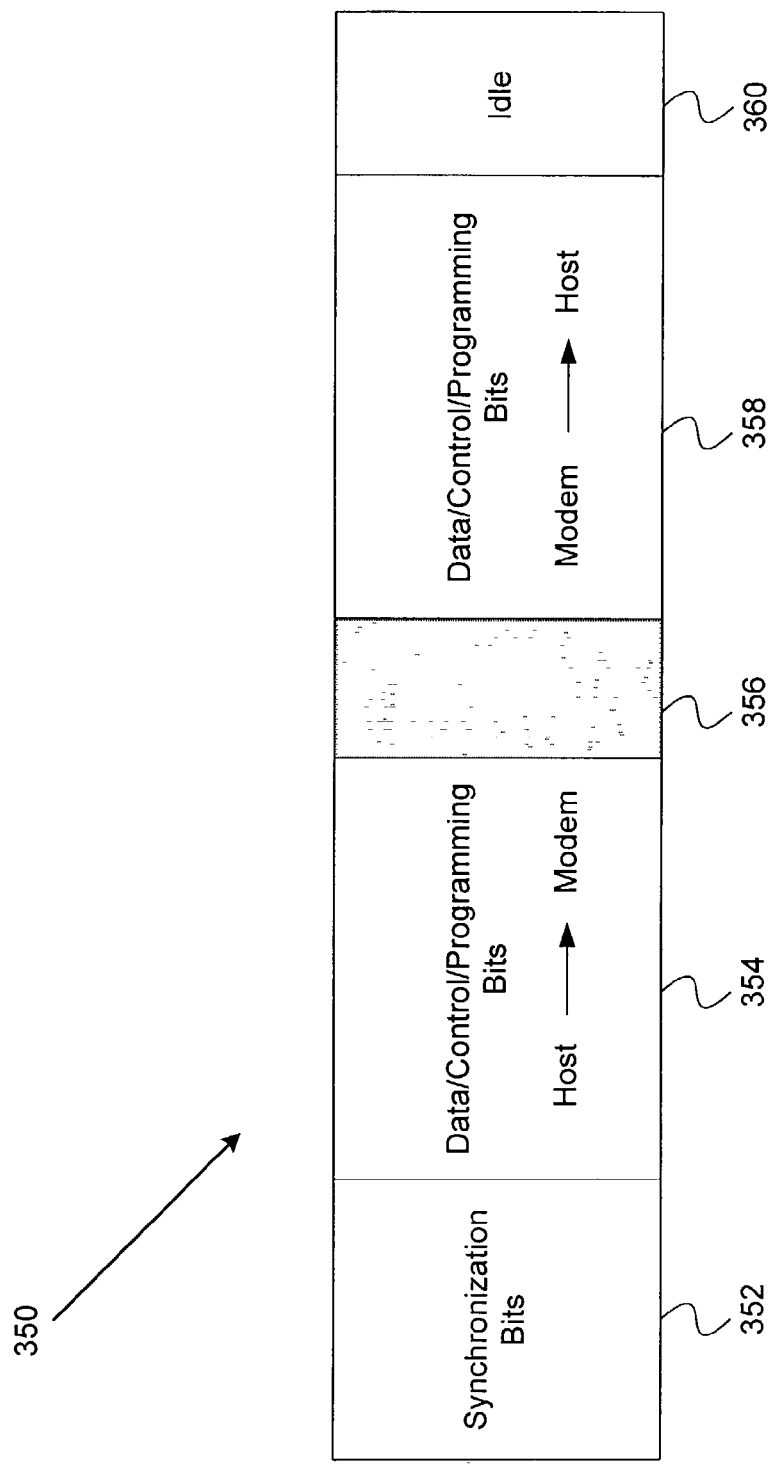
FIG. 3B illustrates a diagram of an exemplary frame protocol for communicating information across the digital isolation barrier of FIG. 3A, in accordance with one embodiment of the present invention.

FIG. 3B is a diagram of an exemplary frame protocol for communicating information across digital isolation barrier 320 of FIG. 3A in accordance with one embodiment of the present invention. Because digital isolation barrier 320 is composed of devices such as capacitors or transformers, DC signals cannot be transmitted across digital isolation barrier 320 and communications are achieved via AC signals. In the present embodiment, an encoding scheme is used to eliminate long sequences of zeros or ones in the data. It should be noted that various protocols or signaling techniques may be used to communicate data across digital isolation barrier 320 to line side circuitry 315 or a host (via modem connector 330) and the serial protocol described below is merely exemplary.

The serial protocol provides sufficient bandwidth to accommodate data from various data, control and status signals of line side circuitry 315. It is also contemplated that errors (such as those due to voltage surges) may be accounted for by error correction techniques. One method of detecting such errors is to include redundancy in the transmitting data, such as providing a separate, redundant data packet for each data packet that is transmitted.

The exemplary frame 350 is composed of a number of components or bit groupings. Specifically, frame synchronization bits 352 are provided to coordinate communications between the host and line side circuitry 315. In one embodiment, frame synchronization bits 352 are provided by the host. Following frame synchronization bits 352, data, control and/or programming bits 354 are transmitted from the host across modem connector 230 and digital isolation barrier 320 to line side circuitry 315. In the present embodiment, in which bi-directional serial communications across digital isolation barrier 320 are utilized, a number of reversal bits 356 are provided in order to allow sufficient time for transceiver circuitry 435 of modem side DIB interface 430 (see FIG. 4) and transceiver circuitry 535 of host side DIB interface 530 (see FIG. 5) to switch direction. The number of bits required depends on the switching time of the particular transceiver circuitry utilized. A specific reversal synchronization pattern may be utilized to initiate reversal of the transceiver circuitry.

Next, data, control and/or programming bits 358 are communicated in a serial manner from line side circuitry 315 to the host via modem connector 330. Idle bits 360 are also provided in the serial frame 350 to provide extra bandwidth (in a predefined frame size) for addition of other capabilities and information. The data, control and/or programming bits 358 may also include interrupt-type information for use in communicating status changes and/or synchronization.

In one embodiment, the encoding protocol involves transmitting data across the digital isolation barrier 320 at half of the clock rate. According to such scheme, a "0" is coded as a logic level low to a logic level high transition, while a "1" is coded as a transition from a logic level high to a logic level low transition. For example, if a 4 MHz clock is provided to line side circuitry 315, a 2 MHz signal derived from the clock signal may be used as a bit clock for serial communications. Using this arrangement, 128 bits are available in serial form during one period of a 16 kHz sample rate with a 2.048 MHz clock (128=4.096 MHz/(2*16 kHz)).

Figure 4:
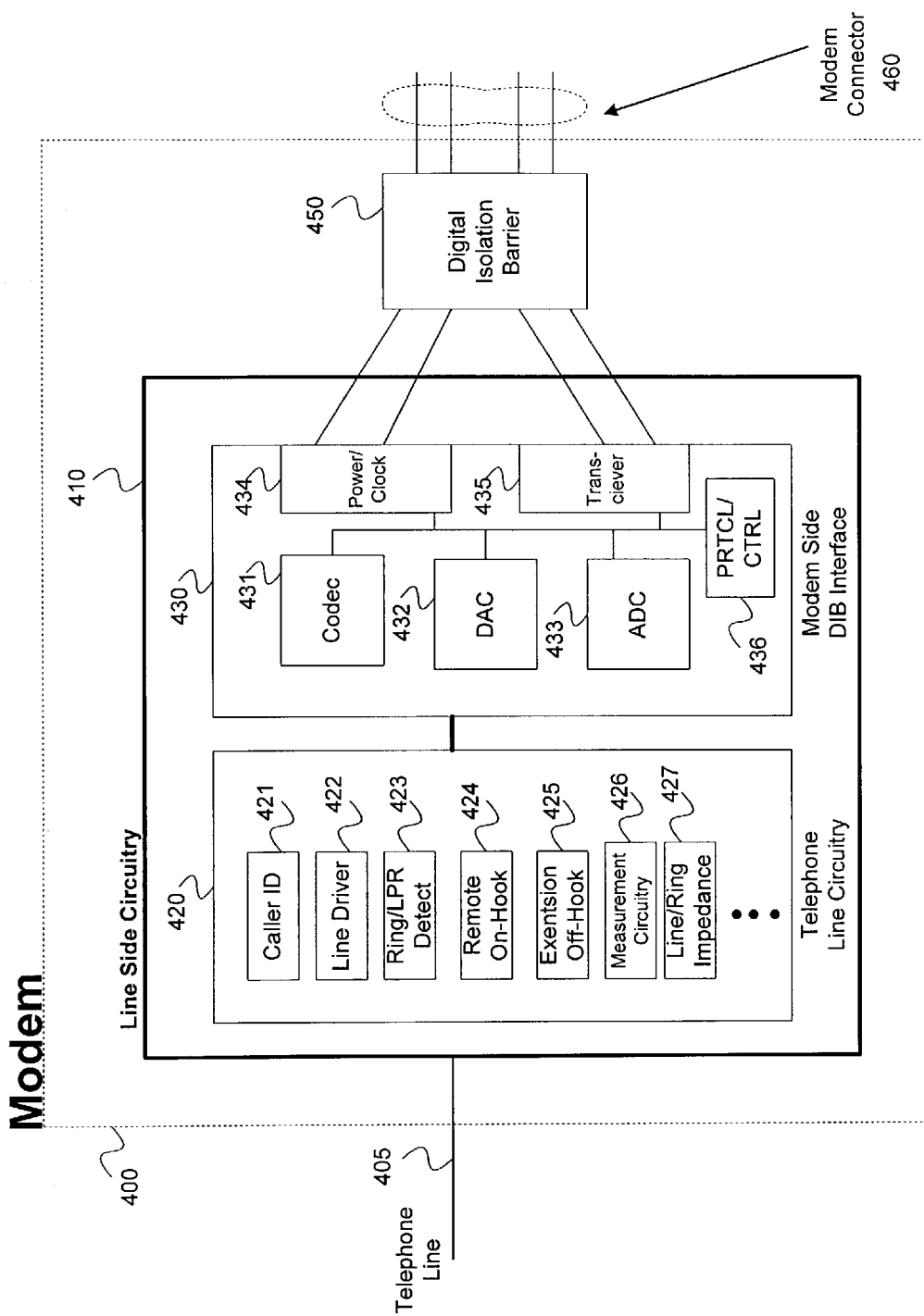
FIG. 4 illustrates a block diagram of the line side circuitry of the communication system of FIG. 2.

Turning to FIG. 4, it illustrates exemplary modem 410, including line side circuitry 410 and digital isolation barrier 450, according to one embodiment of the present invention. As shown, line side circuitry 410 includes modem side DIB interface 430 and telephone line circuitry 420. According to one embodiment, modem side DIB interface 430 is coupled to telephone line circuitry 420 at one side, and connected to digital isolation barrier 450 at the other end. In one embodiment, modem side DIB interface 430 is connected to digital isolation barrier 450 via four lines, which are received by power/clock 434 and transceiver 435. As discussed above, modem side interface 430 may be connected to digital isolation barrier 450 via a single wire or two wires, which can be received by transceiver 435. Accordingly, in some embodiments power/clock 434 is optional. Modem side DIB interface 430 further includes a protocol framing/control circuit 436 that functions to organize the data transmitted by transceiver 435. Protocol framing/control circuit 436 also deconstructs signals received by transceiver 435 from the host via modem connector 460.

As shown, modem side DIB interface 430 also includes codec (coder/decoder) 431, DAC (digital-to-analog converter) 432, ADC (analog-to-digital converter) 433 and a memory (not shown), which, in some embodiments, may store code for execution by modem side DIB interface 430 or may store electrical specifications and configurations relating to the regulatory requirements of various countries. In one embodiment, codec 431 may be a 16 bit/16 kHz second order sigma-delta codec used for sampling analog signals on telephone line 405, or providing such signals to telephone line 405. DAC 432 is utilized for converting digital data, received via transceiver 435, to analog data for transmission to telephone line 405 via codec 431. In addition, ADC 433 is utilized for converting analog data, received from telephone line 405 via codec 431, for transmission to modem connector via transceiver 435. It should be noted that in some embodiments, DAC 432 and ADC 433 may operate as part of codec 431, or may be separate circuits for use by other components of line side circuitry 410. For example, DAC 432 may be utilized by ring/LPR detection circuitry 423. Similarly, ADC 433 may operate in conjunction with measurement circuitry 426, which may include tip/ring voltage measurement and loop current measurement.

Telephone line circuitry 420 may include a variety of circuits depending upon the number of features provided by modem 400. For example, telephone line circuitry 420 may include caller ID 421, which is capable of receiving and decoding caller identification information from telephone line 406. Accordingly, caller ID 421 may include a relatively simple ADC and a demodulator complying with one or more standards (e.g., V.23/Bell 202, ETSI 300778 series). Caller ID 421 may also be capable of transferring caller identification information across digital isolation barrier 450 in a low power state, and can be programmable to provide caller ID information with a ring or line polarity reversal as alert signal.

Telephone line circuitry 420 further includes line driver 422 for providing signals to telephone line 405. Line driver 422 may be programmable to drive signals having the electrical characteristics prescribed by the country in which modem 400 is being used. Telephone line circuitry 420 may also include programmable line/ring impedance 427, which is provided to allow modem 400 or the host to program the electrical characteristics of modem 400 as seen by telephone line 405 to facilitate compliance with a variety of regulatory standards, including country-by-country ring loading.

In addition, programmable measurement circuitry 426 may be provided with adjustable parameters for measuring tip/ring voltage and loop current conditions on telephone line 405. Ring/line polarity reversal (LPR) detect 423 may also be programmable to comply with both U.S. and international requirements. Ring/LPR detect 423 functions to provide ring and ring wake bit signals. In addition, ring/LPR detect 423 is configurable to provide line current sensing information for use by remote on-hook 424 and extension off-hook 425.

In some embodiments of the present invention, modem 400 is designed to operate in a predetermined number of countries and telephone line circuitry 420 is not programmable for unintended regions/countries. For example, according to one aspect of the present invention, modem 400 can be provided in three defined and region/countries specific configurations, wherein in one configuration, modem 400 is operable in Nordic European countries only; in a second configuration, modem 400 may be configured to operate in the rest of Europe, India and Japan only; and in a third configuration, modem 400 may be configured to operate in the remaining countries.

Figure 5:
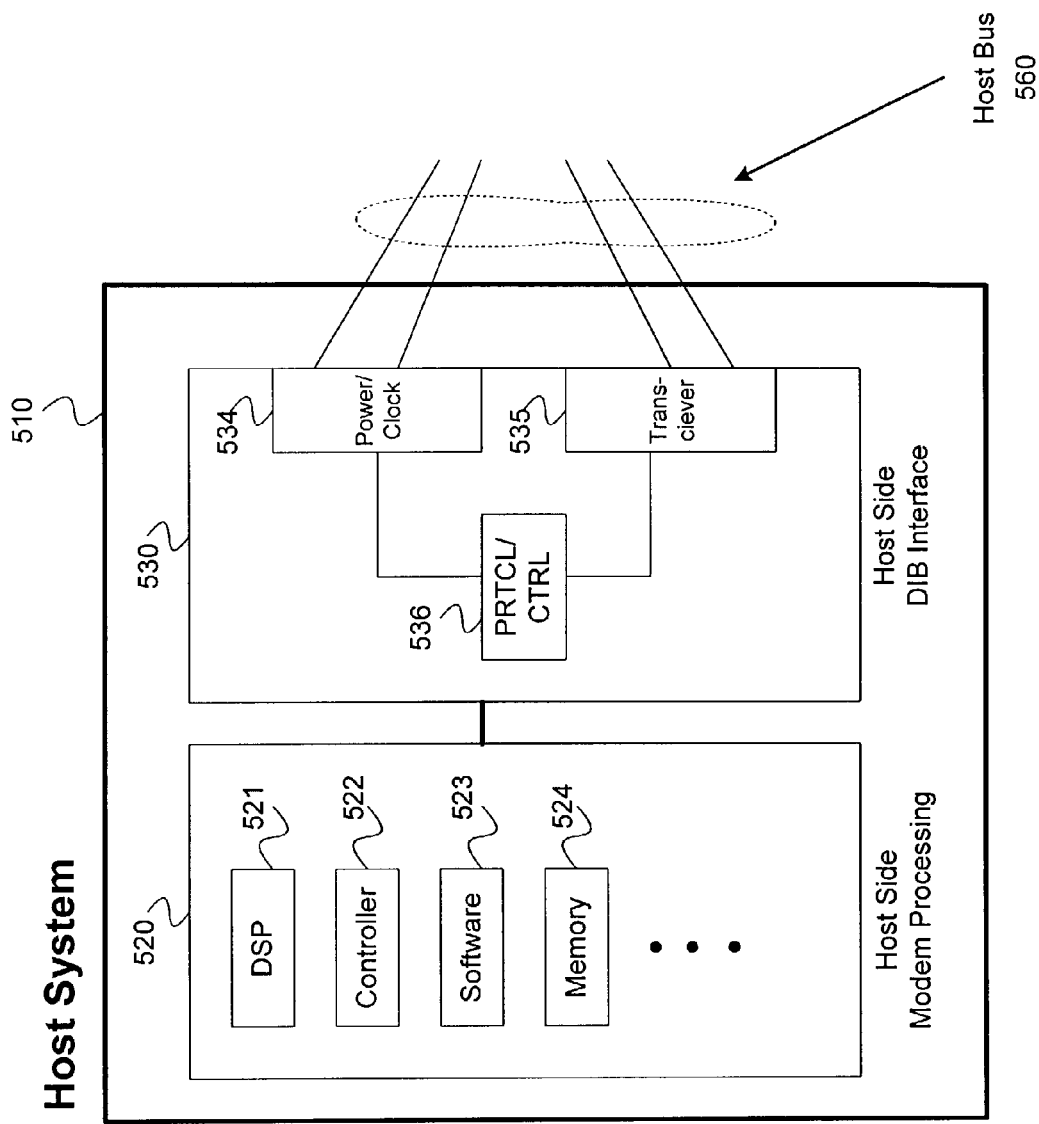
FIG. 5 illustrates a block diagram of the host of the communication system of FIG. 2.

FIG. 5 illustrates an exemplary embodiment of host 510, according to one embodiment of the present invention. As shown, host 510 includes host side DIB interface 530 and host side modem processing 520. According to one embodiment, host side DIB interface 530 is coupled to host side modem processing 520 at one side, and connected to host bus/connector 560 at the other end. Host bus 560 is capable of being connected to modem connector 460, which is in communication with modem side DIB interface 430. In one embodiment, host side DIB interface 530 is connected to host bus 560 via four lines, which are received by power/clock 534 and transceiver 535. As discussed above, host side DIB interface 530 may be connected to host bus 560 via a single wire or two wires, which can be received by transceiver 535. Accordingly, in some embodiments power/clock 434 is optional. Host side DIB interface 530 further includes a protocol framing/control circuit 536 that functions to organize the data transmitted by transceiver 535. Protocol framing/control circuit 536 also deconstructs signals received by transceiver 535 from the modem via host bus 560.

Host side modem processing 520 may include DSP 521, controller 522, software 523 and memory 524. For example, to support controllerless modem 120, host side modem processing 520 would include DSP 521, and software 523 and memory 524 for use by DSP 521. In such event, a host controller (not shown), such as an Intel processor on a computer motherboard provides controller functions using a modem controller software residing in the computer memory. Alternatively, to function as soft modem 120, host side modem processing 520 is eliminated, such that a host controller (not shown) can perform controller and DSP functions using a modem controller and DSP software residing in the computer memory. As another example, to support controller-based modem 110, host side modem processing 520 would include controller 522 and DSP 521, and software 523 and memory 524 for use by controller 522 and DSP 521. In such event, software 523 would support various modem DSP functions, such as V.92, V.90, V.34, V.32, etc. modulation techniques, and modem controller functions, such as V.42 error correction, and V.42bis data compression, etc.

In one exemplary embodiment of the present invention, following the application of power to modem 400, modem 400 enters an optional sleep or listen mode. Next, modem 400 determines if a synchronization packet has been received from host 510 via digital isolation barrier 450. If so, modem 400 exits sleep mode, else line side circuitry 410 determines if an interrupt has been generated by any of telephone line circuitry 420 connected to telephone line 405. If an interrupt has been received, modem 400 exits sleep mode and a signal is then communicated to host 510 to request synchronization. After exiting modem sleep mode, modem 400 determines if synchronization with host 410 has been achieved. If not, a timeout counter is examined to determine if a predetermined amount of time has expired without synchronization. If the predetermined amount of time has not expired, the synchronization process described above continues. If the time-out value has been reached, or if an interrupt has not been received, modem 400 may enter an optional sleep or listen mode.

Similarly, following the application of power to host 510, host 510 enters a wake-up or resynchronization mode. Next, transceiver 535 transmits a synchronization packet to modem 400 across modem connector-460. Host 510 then awaits signals from modem 400 indicating that synchronization has been achieved. If synchronization is not achieved, a counter is examined to determine if a predetermined time-out value has reached. If the timeout value has surpassed, an additional synchronization packet may be transmitted. If synchronization is achieved, serial data, control and/or programming signals are transmitted or received by transceivers 435 and 535. Following completion of the serial communications, an optional low power mode is entered, where host 510 enters a sleep mode and awaits a wake-up signal or service request from modem 400.

It should be noted that in some embodiments, for example, when modem 400 is utilized in a game console or a set-top box, as host 510, modem 400 and/or host 510 may not include a sleep mode, and remain in active mode after the application of power. Furthermore, one of ordinary skill in the art would realize that there are a variety of ways to achieve a connection between or synchronize modem 400 and host 510 after the application of power.

Figure 6:
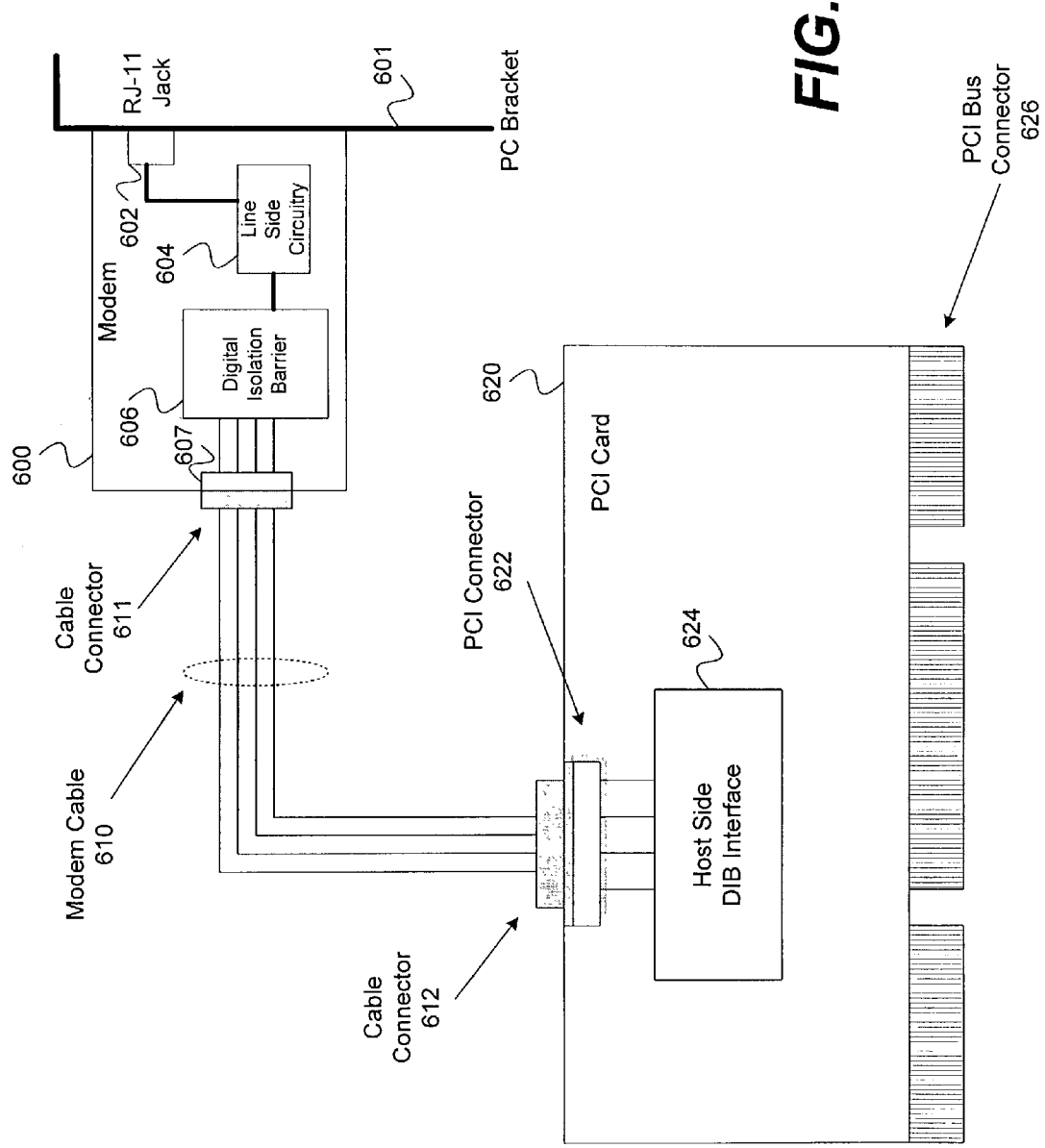
FIG. 6 illustrates a block diagram of an exemplary modem of the present invention for connection to a computer card.

FIG. 6 illustrates a block diagram of an exemplary modem of the present invention for connection to a communication card, such as a PCI card, an AMR card, a CNR card, an ACR card, etc. As shown, modem 600 is attached to PC bracket 601, which is a typical square bracket used to add peripheral components to a personal computer. PC bracket 601 exposes RJ-11 jack 602 of modem 600 to the outside of the personal computer for receiving a telephone line (not shown). Modem 600 also includes line side circuitry 604, similar to line side circuitry 410 of FIG. 4, and digital isolation barrier 606, similar to digital isolation barrier 320 of FIG. 3A. Line side circuitry 604 is in communication with the telephone line via RJ-11 jack 602, and digital isolation barrier 606 isolates line side circuitry 604 from modem connector 607. As shown, modem cable 610, with cable connectors 611 and 612 at each end, provides connectivity between PCI card 620 and modem 600. In one embodiment, modem cable 610 provides a two-wire path for control/data signal and a two-wire path for power/clock signals. As discussed above, in various embodiments of the present invention, modem cable 610 may be a one-wire, two-wire, three-wire or n-wire cable. For example, in a two-wire modem cable, the two wires provide a path for data/control. In other embodiments, additional wires may be added to provide additional signals, such as a ground signal.

As shown, PCI card 620 includes PCI connector 622 for receiving cable connector 612 and for connecting digital isolation barrier 606 of modem 600 to host side DIB interface 624, similar to host side DIB interface 530 of FIG. 5. PCI card 620 also includes PCI bus connector 620, which can be plugged into one of PCI bus slots (not shown) of the personal computer. It should be noted that PCI card 620 may include a controller, a DSP and a memory with software to provide a controller-based modem, or may include a DSP and a memory with software to provide a controllerless modem being controlled by a host processor in the personal computer, or may merely route wires from host side DIB interface 624 to PCI bus connector 626 to provide a connection between the host processor and modem 600.

FIG. 7 illustrates a block diagram of an exemplary modem 700 of the present invention for connection to a computer motherboard. Modem 700, including RJ-11 jack 702, line side circuitry 704 and digital isolation barrier 706 correspond to modem 600, including RJ-11 jack 602, line side circuitry 604 and digital isolation barrier 606 of FIG. 6, respectively. As shown, modem 700 may be attached to PC bracket 701, which corresponds to PC bracket 601 of FIG. 6. Modem 700 further includes modem connector 712, which is capable of being plugged into PC DIB bus 722 on PC motherboard 720. Although not shown, PC motherboard 720 also includes a host side DIB interface, similar to host side DIB interface 624, which provides an interface between PC DIB bus 722 and a PC or host processor (not shown). Accordingly, a communication path is provided between the host processor and digital isolation barrier 706 of modem 700 via the host side DIB interface, PC DIB bus 722 and modem connector 707.

As discussed above, modem cable 710 may be a one-wire, two-wire, three-wire, four-wire (such as the present embodiment) cable, or provide additional wires for providing more signals between modem 700 and PC DIB bus 722. Accordingly, PC DIB bus may vary in size. In the exemplary embodiment of FIG. 7, PC DIB bus 722 may include four connectors to receive two wires for data/control and two wires for power/clock. PC DIB bus 722 may also include an additional wire for a ground signal. However, in some embodiments, PC DIB bus 722 may include only one or two connectors for receiving data/control.

Figure 8A:
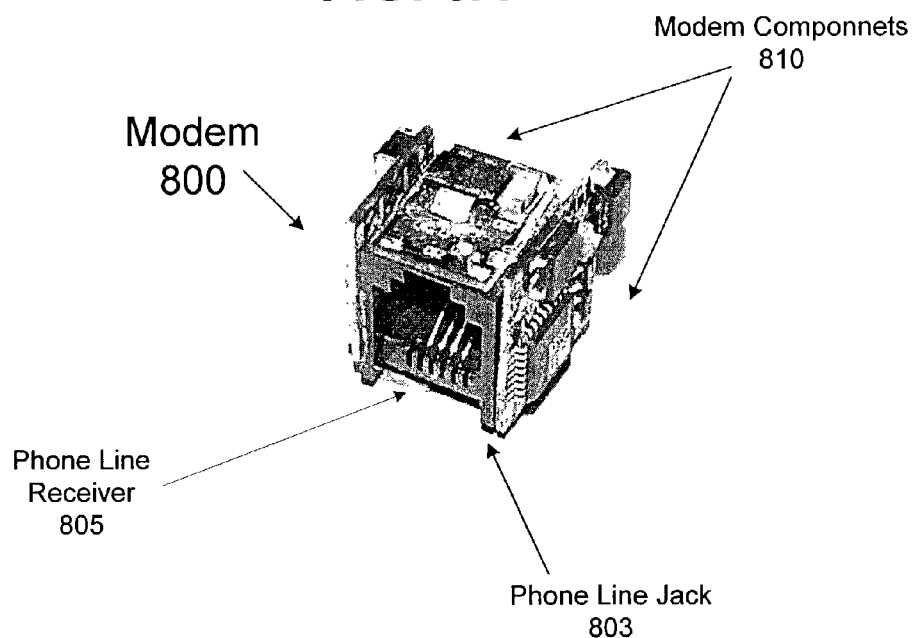
FIG. 8A illustrates a full front view of an exemplary modem of the present invention, wherein the modem components are populated on a telephone line jack.

FIG. 8A illustrates a full front view of an exemplary modem 800 of the present invention, wherein modem components 810 are populated on telephone line jack 803, such as an RJ-11 jack. As shown, modem 800 includes telephone line jack 803 having telephone line receiver 805 with an opening to receive a telephone line. The opening defines a number of walls in telephone line jack 803. As shown, modem components 810 may be populated on one or more of the walls. In one embodiment, modem components include a line side circuitry, similar to line side circuitry 704, coupled to telephone line receiver 805 for connection to a telephone line. Further, modem 800 includes a digital isolation barrier, similar to digital isolation barrier 706, for isolating the line side circuitry and the telephone line from a modem connector, such as modem connector 707, which is capable of being connected to a host.

Figure 8B:
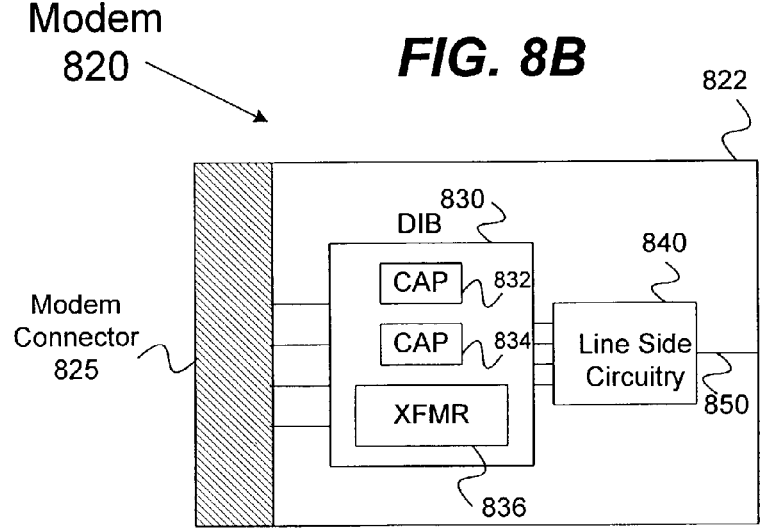
FIG. 8B illustrates a top view of an exemplary modem of the present invention, wherein the modem components are populated on top of a telephone line jack.

FIG. 8B illustrates a top view of an exemplary modem 820 of the present invention, wherein modem components are populated on a top wall of telephone line jack 822. As shown, the modem components include digital isolation barrier 830, including two capacitors 832 and 834, and transformer 836. Digital isolation barrier 830 is connected to modem connector 825 at one end, and line side circuitry 840 at the other end. Further, line side circuitry 840 is connected to a phone line receiver of telephone line jack 822 via line 850. In some embodiments, such as the embodiment of FIG. 8A, some of the modem components may be populated on the side walls or the bottom wall of telephone line jack 822. Further, digital isolation barrier 830 may include less components, as discussed above in conjunction with FIG. 3A.

Figure 9:
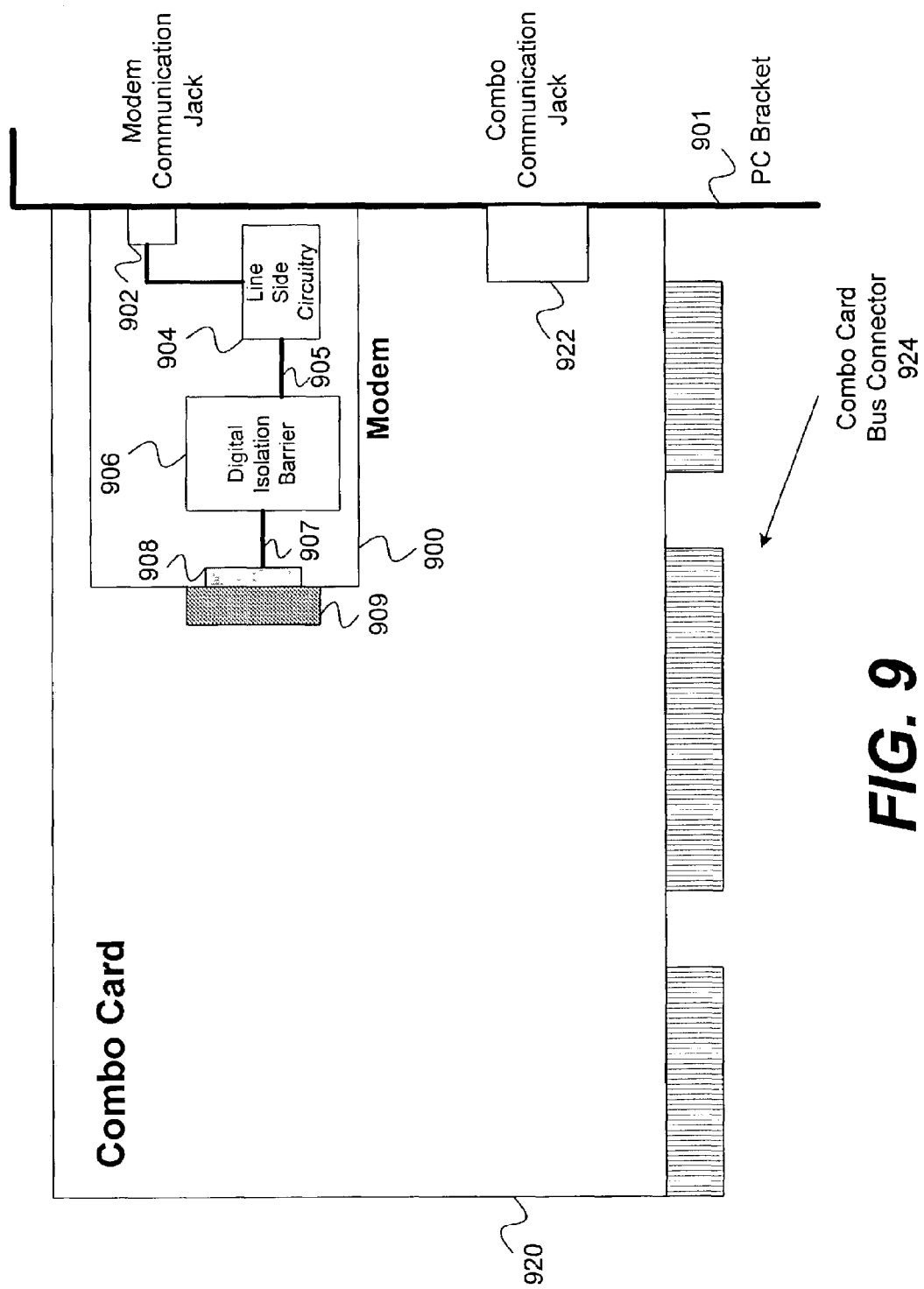
FIG. 9 illustrates a block diagram of an exemplary modem of the present invention for connection to a combo card.

FIG. 9 illustrates a block diagram of an exemplary modem of the present invention for connection to combo card 920, such as a LAN card, audio card, BlueTooth card, Ethernet card, etc. As shown, modem 900 may be attached or plugged into to combo card 920, which is attached to PC bracket 901. PC bracket 901 is a typical square bracket used to add peripheral components to a personal computer and, as shown, can expose modem communication jack 902, such as RJ-11 jack, and combo communication jack 922, such as RJ-45 jack, to the outside of the personal computer for receiving communication lines (not shown). Modem 900 also includes line side circuitry 904 and digital isolation barrier 906. Line side circuitry 904 can be placed in communication with a communication line via modem communication jack 902, and digital isolation barrier 906 isolates line side circuitry 904 from modem connector 908. As shown, modem connector 908 may be connected to or plugged into combo card connector 909, which provide connectivity between combo card 920 and modem 900. As shown, line side circuitry 905 and digital isolation barrier 906 communicate via line 905. Also, digital isolation barrier 906 communicates with combo card 920 via lines 907 and connectors 908 and 900. As stated above, lines 905, and 907 may include any number of wires, e.g. 1-n wires.

In one embodiment, combo card 920 may include a host side DIB interface (not shown) for communication with digital isolation barrier 906. In other embodiments, however, combo card 920 may route line 907, received via connectors 908 and 909, to combo card connector bus 924. In such embodiments, the personal computer would include host side DIB interface (not shown), rather than combo card 920.

The methods and systems presented above may reside in software, hardware, and/or firmware on the device, which can be implemented on a microprocessor, digital signal processor, application specific IC, or field programmable gate array ("FPGA"), or any combination thereof, without departing from the spirit of the invention. Furthermore, the present invention may be embodied in other specific forms without departing from its spirit or essential characteristics. The described embodiments are to be considered in all respects only as illustrative and not restrictive.

What is claimed is:

1. A modem system for use to enable a host to communicate over a communication line, said host having a host connector, said modem system comprising:
   a line side circuitry capable of interfacing with said communication line;
   a digital isolation barrier (DIB) coupled to said line side circuitry, said digital isolation barrier being configured to connect to a modem connector, said digital isolation barrier isolating said modem connector from said line side circuitry, said modem connector being configured to connect to said host connector; and
   a telephone line jack having an opening for receiving said communication line, said opening defining a plurality of side walls of said telephone line jack and said opening being configured to receive said communication line, one or more of said plurality of side walls of said telephone line jack being populated with components of said line circuitry and said digital isolation barrier.

2. The modem system of claim 1, wherein said digital isolation barrier is connected to said modem connector.

3. The modem system of claim 1, wherein said modem connector is connected to said host connector.

4. The modem system of claim 1, wherein said line side circuitry includes a line side DIB interface for communication with said digital isolation barrier.

5. The modem system of claim 1, wherein said digital isolation barrier is coupled to said line side circuitry only via a plurality of lines consisting of two lines of data and control and two lines of power and clock.

6. The modem system of claim 1, wherein said digital isolation barrier is coupled to said line side circuitry only via a plurality of lines selected from a group consisting of two lines of data and control and three lines of power, ground and clock.

7. The modem system of claim 1, wherein said modem connector is connected to said digital isolation barrier only via three lines consisting of two lines of data and control and one line of clock.

8. The modem system of claim 1, wherein said modem connector is connected to said digital isolation barrier only via five lines consisting of two lines of data and control, one line of clock, one line of power and one line of ground.

9. The modem system of claim 1, wherein said modem connector is connected to said digital isolation barrier only via a single differential pair of lines of data and control.

10. The modem system of claim 1, wherein said modem connector is connected to said digital isolation barrier only via said single differential pair of lines of data and control and one ground line.

11. The modem system of claim 1, wherein said modem connector is connected to said digital isolation barrier only via four lines consisting of two lines of data and control, one line of clock and one line of power.

12. The modem system of claim 1, wherein said digital isolation barrier is connected to said modem connector via a direct wire connection, and wherein said modem connector is capable of being connected to said host connector by extending said direct wire connection.

* * * * *

UNITED STATES PATENT AND TRADEMARK OFFICE
CERTIFICATE OF CORRECTION

| | | |
|---|---|---|
| PATENT NO. | : 7,330,544 B2 | Page 1 of 1 |
| APPLICATION NO. | : 10/137601 | |
| DATED | : February 12, 2008 | |
| INVENTOR(S) | : D'Angelo et al. | |

It is certified that error appears in the above-identified patent and that said Letters Patent is hereby corrected as shown below:

Column 16, line 28, "modern" should be changed to --modem--.

Signed and Sealed this

Twenty-seventh Day of May, 2008

JON W. DUDAS
*Director of the United States Patent and Trademark Office*